Patented Jan. 7, 1947

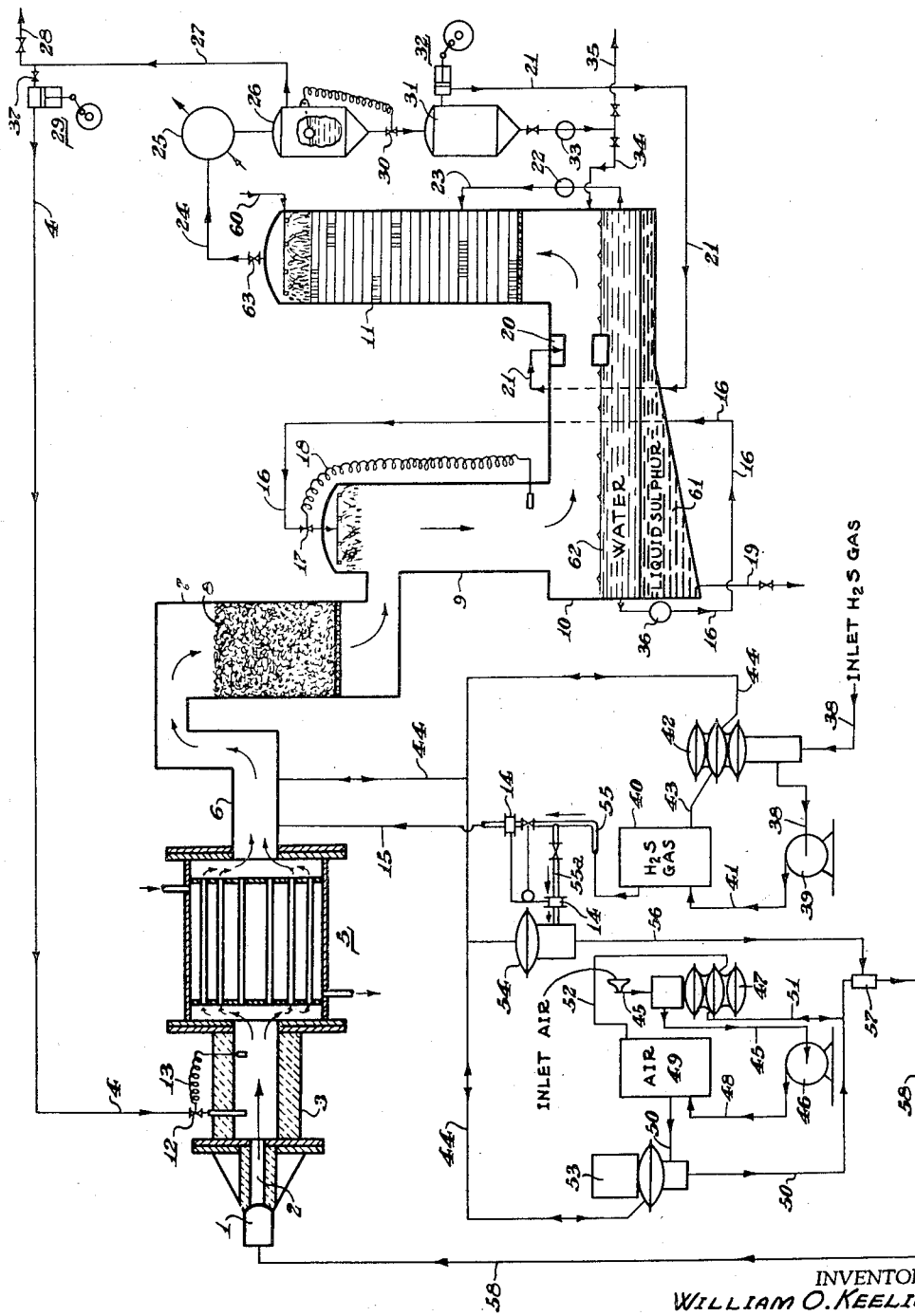

2,413,714

UNITED STATES PATENT OFFICE 2,413,714

PROCESS OF PRODUCING ELEMENTAL SULPHUR

William O. Keeling, Pittsburgh, Pa., assignor, by mesne assignments, to Koppers Company, Inc., a corporation of Delaware Application April 30, 1942, Serial No. 441,097

13 Claims. (Cl. 23—225)

The present invention relates to the production of elemental sulphur from hydrogen sulphide or from gases containing the same.

An object of the present invention is provision of improvements in method and means for converting hydrogen sulphide into elemental sulphur and for recovering the same in predominantly liquid form.

A further object of improvement is provision of improved method and means whereby hydrogen sulphide from whatever source, for example, derived from fuel gases, can in simple manner be converted into elemental sulphur and be conveniently recovered directly in predominantly liquid form.

A further object of invention is provision of method and means whereby the high velocity of the mutual oxidation-reduction reaction between hydrogen sulphide and sulphur dioxide at elevated temperatures, to form elemental sulphur, can be feasibly employed in the conversion of hydrogen sulphide to the latter said substance without substantial loss, while directly recovering the resultant sulphur predominantly in its liquid form.

A further object of invention is the provision of novel method and means for maintaining gases effluent to a process for converting hydrogen sulphide and sulphur dioxide into elemental sulphur substantially free of these corrosive substances at all times.

The invention has for further objects such other improvements and such other operative advantages or results as may be found to obtain in the processes or apparatus hereinafter described or claimed.

It is known to produce elemental sulphur by the reaction of a volume of sulphur dioxide with twice its volume of hydrogen sulphide, the said sulphur dioxide being first produced, if preferred, by the combustion of hydrogen sulphide. The two reactions can be expressed by the equations (1) $2H_2S + 3O_2 = 2SO_2 + 2H_2O$
(2) $2H_2S + SO_2 \rightleftarrows 3S + 2H_2O$

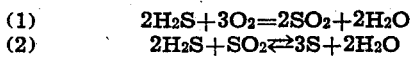

This reaction between hydrogen sulphide and sulphur dioxide can take place at ordinary temperatures and pressures in aqueous solution. The so-produced sulphur being in such instance in solid form is removed from the system by some such means as filtration, or the like, of its resultant aqueous suspension. The reaction can go practically to completion at said ordinary temperatures but disadvantageously requires a long period of time and consequently apparatus of relatively large dimensions to permit equilibrium being established. The reaction also takes place at elevated temperatures at which the produced sulphur is in its vapor phase; at such temperatures, the reaction reaches equilibrium with importantly increased velocity, thereby greatly reducing the time and consequently the size of apparatus requirements necessary to achieve equilibrium. Super-atmospheric pressures are also advantageous. A catalyst, for example bauxite, can also be employed further to increase the velocity of the reaction and thus still further shorten the time required for reaction equilibrium to be established.

However, the reaction between hydrogen sulphide and sulphur dioxide exhibits a high degree of reversibility at elevated temperatures, the equilibrium tending to be displaced to the left of Equation 2; that is, as the temperature is increased at which the reaction is carried out, increased amounts of the produced sulphur react with the water of formation to revert to hydrogen sulphide and sulphur dioxide, thereby subtracting somewhat from the advantages of increased velocity of the reaction at the elevated temperatures. By means of the present improvement, it is possible to enjoy the said advantages of the high velocity of the reaction between hydrogen sulphide and sulphur dioxide to produce elemental sulphur at elevated temperatures, which incidentally advantageously permits recovery of the produced sulphur in liquid form directly, and at the same time so to overcome the attendant above-described reversibility of the reaction that substantially the entire content of sulphur of the reacting gases can be recovered as elemental sulphur which is an object of the process.

According to the present improvement, gaseous hydrogen sulphide and sulphur dioxide are allowed to react under pressure in respectively the volume ratio of substantially 2 to 1 at temperatures of from about 300° to 750° C., preferably in the presence of a suitable catalyst, until their reaction has come substantially to equilibrium at the chosen temperature to produce elemental sulphur. Thereafter and still under pressure the products of reaction are flowed into direct contact with water, preferably in the form of a spray, which is under sufficient pressure to maintain it as a liquid at or above the melting point of the thereby condensed sulphur which, after settling, can be flowed from the process system. This cooling step for the products of the reaction at high temperature advantageously shifts the equilibrium of reaction of Equation 2 further to the right and the presence of the liquid water facilitates further the conversion of sulphur dioxide and hydrogen sulphide, that are residual to the high-temperature phase of the reaction, also to elemental sulphur which at the temperature of said cooling is in liquid form. Thereafter, gases that are residual to said cooling step, and while still under pressure, are flowed into a gas-and-liquid contact apparatus wherein they come into countercurrent contact with a flow of water of decreasing temperature and preferably containing some excess of dissolved sulphur dioxide, thereby converting substantially all yet residual hydrogen sulphide to elemental sulphur, which is thereafter commingled with sulphur condensed in the first cooling step and thereby melted and withdrawn from the process apparatus. The said excess of sulphur dioxide in the latter said cooling step can be entrapped in the apparatus system by means hereinafter described. Gases residual to the said cooling steps and comprising substantially only traces of hydrogen sulphide and sulphur dioxide and some carbon dioxide, especially if the sulphur dioxide introduced initially into the process results from the combustion of hydrogen sulphide recovered from either natural gas or gases of fuel carbonization, are vented from the apparatus system or can be reused in the processes, for example, for cooling the products of combustion of hydrogen sulphide to produce the sulphur dioxide required for the process.

In the accompanying drawing forming a part of this specification, there is shown for purposes of exemplification a preferred apparatus and method in which the invention may be embodied and practiced but without limiting the claimed invention specifically to such illustrative instance or instances: the single figure shows a diagrammatic representation partly in elevation and partly in vertical section of apparatus for carrying out the improvement provided by the present invention.

Air and gas containing hydrogen sulphide are admixed, under pressure, as will be later described, while maintaining said constituents in fixed ratio. The said ratio is so chosen as to assure substantially complete conversion of the said admixture's hydrogen sulphide content to sulphur dioxide, upon the subsequent combustion thereof. Since the hydrogen sulphide can have its source in an industrial process, for example, a process for its removal from gases of fuel carbonization or of natural gas, the said hydrogen sulphide or hydrogen-sulphide-containing gas may well contain some inert gases and hydrocarbons, or it can carry along from such purification process organic compounds; for example, portions of the purified gases or organic purification media. In cases where other combustible compounds are present in said hydrogen sulphide, the controlled quantity of admixed air should be sufficient for their combustion as well as the hydrogen sulphide.

The said admixture of gas and air, under sufficient pressure to cause it to flow at the pressure maintained in the apparatus system, issues from inspirator 57 through line 58 to combustion means that can be any known type of apparatus and is here shown as a tunnel-type surface combustion burner 1, the combustion taking place in tunnel 2 thereof. The hot products of combustion under pressure and comprising sulphur dioxide, flow into refractory lined chamber 3 where, if preferred, they can receive a preliminary cooling through admixture with a cooler gas from line 4, said gas comprising largely inert gases with some sulphur dioxide which are obtained from a further step in the process. Any employed quantity of cooling gases is controlled by regulating valve 12, itself actuated by pyrometer 13, located near the outlet of said chamber 3. In those of its applications where the present process is so operated that quantities of cooling gases are not available or desired for the stated purpose, the said mixing chamber can be eliminated and the hot combustion gases can be discharged directly to a waste heat boiler 5, or any other means can be employed for cooling them to an optimum point for subsequent and efficient use of a catalyst. Heat recovered in waste-heat boiler 5 is of utility as a source of power; for example, for the production of steam.

The hot combustion gases from burner 1 can be cooled in chamber 3 with such quantities of hydrogen sulphide as are required to react with the sulphur dioxide present therein to convert it to elemental sulphur. However, this practice is usually not preferred, since of the three constituents that would be present in such admixture, namely, sulphur, hydrogen sulphide and sulphur dioxide, the sulphur and hydrogen sulphide are much more corrosive to ordinary metals than sulphur dioxide. Expensive, resistant materials, for example, chrome-nickel alloys would be consequently required in the construction of a suitable waste heat boiler. For this reason, complete combustion to sulphur dioxide without excess of hydrogen sulphide in the combustion gases is essential where ordinary steel is employed in a waste heat boiler.

The cooled combustion products from waste heat boiler 5, that can range in temperature from about 300° C. to about 750° C., now flow to mixing device 6 wherein the said products are admixed with such quantities of a gas containing hydrogen sulphide as to maintain in the resultant mixture a stoichiometric ratio of about two parts hydrogen sulphide and one part sulphur dioxide. The hydrogen sulphide gas, controlled as to quantity by means later to be described, enters mixing chamber 6 through line 15. The resultant admixture then flows at a temperature usually not higher than about 450° C. to catalyst chamber 7 and into contact with any known catalyst 8, such for example, as bauxite, iron oxide, activated alumina, or any other suitable catalyst that can aid in more quickly attaining equilibrium in the reaction of sulphur dioxide and hydrogen sulphide to form elemental sulphur. The various available catalysts that can be employed operate at different temperatures for maximum efficiency. Usually, the inlet temperature of an admixture to a catalyst chamber is so chosen as to yield a final reaction temperature at the outlet, not greatly exceeding 700° C.

The products of the catalytic reaction immediately thereafter flow to direct condenser 9 wherein they come into contact with a water spray from line 16, the quantity of water being regulated by control valve 17, the said valve in turn being actuated by pyrometer 18 that is located near the outlet of condenser 9. The quantity of water is so proportioned as to shock chill the sulphur vapors and cool them sufficiently only to convert them to the liquid and not the solid phase, thereby preventing any appreciable reversal of the catalytically aided reaction while aiding further vapor-phase reaction of still unreacted hydrogen sulphide and sulphur dioxide to form sulphur, and also converting all the produced sulphur to a form wherein it can be easily and conveniently handled and separated from the liquid cooling water, without need for elaborate filtering devices, or the equivalent. Maintenance of both the water and the sulphur in the liquid phase at a temperature of about 125° C. is made possible by maintaining the pressure in condenser 9 at, at least, about 20 pounds gauge pressure, this pressure being primarily supplied by the pressure head at which the mixture of air and hydrogen sulphide is delivered to burner 1. Manifestly, if the employed pressures in those process steps prior to said condensation are lower than required to maintain water in liquid phase in the condensation step, a booster means must be employed at some point between the individual steps. After condensation, the liquid sulphur and water with accompanying gases and vapors flow to reservoir 10, here shown as a conical or trough-shaped receiver, conveniently located below condenser 9. The liquid sulphur, because of a specific gravity higher than that of water, forms the lower phase 61 in said reservoir, with water the upper phase 62. The said liquid sulphur can be conveniently drawn off through valved line 19 for further disposition, as preferred. The upper phase 62 of accumulated cooling water is recirculated over condenser 9, by pump 36, through line 16, and to the lower part of tower 11 in a manner later to be described. Not only can water be used for this condensation step, but other liquids, for example, alcohols can be employed; polar liquids such as water or alcohol are preferable. Obviously, if the liquid chosen for direct cooling in the step for condensing vaporous sulphur is liquid above the melting point of sulphur, this step can be performed at ordinary pressure.

This cooling step for the products of the reaction at high temperature advantageously shifts the equilibrium of reaction of the hereinabove given Equation 2 further to the right. The presence of the liquid water, in finely divided form and as a film on the walls of condenser 9 and reservoir 10, serves advantageously also as a catalyst to promote the further vapor-phase conversion to elemental sulphur at lower temperature of still unconverted hydrogen sulphide and sulphur dioxide that are residual to the high temperature phase of the reaction. Conversion of so-produced sulphur to its liquid phase and its consequent rapid and automatic removal from the vapor-phase reaction system by sealing it below the water layer in reservoir 10, serve to remove it from the vapor-phase reaction zone of lower temperature and consequently to shift the reaction in the direction of complete conversion of the hydrogen sulphide and sulphur dioxide to sulphur. Baffles can be employed to increase the path of travel of reactants across the water surface in reservoir 10, and consequently the time of contact for said vapor-phase reaction between sulphur dioxide and hydrogen sulphide. The uncondensed vapors and gases in reservoir 10, comprising any residual uncombined sulphur dioxide and hydrogen sulphide and also inert gases such as nitrogen and carbon dioxide and also water vapor, can be vented therefrom, where external conditions permit.

In the present embodiment, however, these uncondensed vapors and gases are flowed to a further reaction step in packed tower 11 for further conversion of any remaining sulphur dioxide and hydrogen sulphide to elemental sulphur. For this purpose the gases and vapors first pass through a suitable mixing device 20, which can be in the form of a partition in reservoir 10, whereby they are admixed with a sulphur-dioxide-containing gas from line 21, obtained from a later step in the process. The so-formed admixture usually comprising an excess of sulphur dioxide to insure the substantially complete reaction and elimination of hydrogen sulphide, passes upwardly through tower 11, being countercurrently scrubbed with water at decreasing temperatures. Liquid water from reservoir 10 is supplied by pump 22 and line 23 to one of the lower sections of tower 11 and serves to effect a still further reaction between hydrogen sulphide and sulphur dioxide, by contact with water, to produce liquid elemental sulphur which flows into liquid sulphur layer 61 in reservoir 10. Colder water is supplied to the top of tower 11 through line 60 and serves to scrub traces of hydrogen sulphide and sulphur dioxide from the upflowing gases which thereafter react to form sulphur as a finely divided suspension, that is later melted in its downward passage and finds its way to reservoir 10. The novel use of decreasing water temperatures in a liquid-phase reaction tower is of great utility, because higher water temperatures favor reaction between hydrogen sulphide and sulphur dioxide to form sulphur, whereas colder water minimizes the volume of said gases that escape from the reaction system, the so-entrapped gases thereafter flowing downwardly to a temperature zone that favors reaction therebetween. In the step of the present process carried out in scrubber 11, more than 90 per cent of uncombined hydrogen sulphide flowing thereinto can be recovered as elemental sulphur.

Any uncondensed gases and vapors comprising inert gases originally associated with the hydrogen sulphide, inert combustion products, water vapor, traces of sulphur dioxide and hydrogen sulphide, leave tower 11 through pressure control valve 63, that can be any valve for regulating back pressure on the whole system, and then pass through line 24 to condenser 25, preferably one of the indirect type, wherein the water vapor is condensed. The condensate and fixed gases then enter a receiver 26 wherein the fixed gases are separated from aqueous condensate. The said fixed gases can all be vented to the air, through line 27 and valved line 28, or if preferred a portion can be recycled through valve 37, compressor 29 and line 4 to chamber 3 for initially cooling the combustion products. The water condensate in receiver 26 can then be regulably withdrawn through level-controller valve 30 to a degasser 31, maintained under a vacuum by pump 32. Dissolved gases in the aqueous condensate and comprising sulphur dioxide with mere traces of hydrogen sulphide, are withdrawn by said pump and recycled to the reaction system through line 21 and mixing device 20 for use, as previously described. The water in degasser 31 can be discharged from the system through pump 33 and valved branch line 35 or part of it can be returned as cooling water to reservoir 10, through valved branch line 34. After passing through degasser 31, the said water when discharged from the reaction system will be substantially free of noxious gases and complex thio-acids.

As hereinabove stated, gaseous pressure in all of the various features of apparatus of the described hydrogen sulphide conversion system is maintained preferably at above atmospheric and manifestly both the hydrogen sulphide and the air must be available and be delivered thereinto at still higher levels of pressure; in addition, in the interests of continuous and uninterrupted operation with the best yields over a long period of time, means should be provided to deliver said gases into the apparatus not only in their ratios of reaction, but also at a diversity of rates that are adapted so to compensate for normal fluctuations of pressure in the apparatus-system that a given set of operating pressures is at all times uniformly maintainable throughout the system. All these requirements are automatically provided for in the illustrated apparatus, and continuous operation is assured over a long period of time without requiring manual control.

In pressure-tanks 40, 49, hydrogen sulphide and air are respectively stored at higher than system pressure, before their introduction into the process-system, and after they have been compressed and delivered thereinto by their individual compressors, respectively 39, 46, the hydrogen sulphide flowing into the low-pressure side of its compressor through line 38 which communicates with a source thereof, whereas air for burning the same enters the low-pressure side of its compressor from the atmosphere through line 45. In the present embodiment of the invention, the air whereby is burned that portion of hydrogen sulphide which is converted into sulphur dioxide in surface-combustion burner 1, is also employed to inspirate such hydrogen-sulphide portion into said burner. To this end, the combustion-destined air flows from its storage tank 49 at a pre-adjusted rate through line 50 into inspirator 57 where, by reduction of its static pressure, it draws hydrogen sulphide into admixture therewith after its introduction into line 56 from storage tank 40, the admixture being thereafter delivered into pipe 58 whence it enters surface-combustion burner 1 and is burned.

For every part of hydrogen sulphide burned to sulphur dioxide in burner 1 at least two parts of the same are required to be admixed with said combustion products to assure complete conversion of the sulphur content of the both into elemental sulphur. To assure automatically such distribution into said process steps of the to-be-treated hydrogen sulphide, the total quantity thereof delivered thereinto from its pressure-storage tank 40, by way of its outlet line 55, is proportioned to the latter's branch lines 55a, 15, by means of ratio-of-flow device 14, the flow of hydrogen sulphide flowing through line 55a, its flow-control valve 54 and into inspirator 57 being automatically regulated by device 14 to be one-half of that quantity delivered into line 15, and by the same, introduced into combustion-products flowing through mixing device 6. Thus, regardless of the rate at which hydrogen sulphide is delivered into the process, it is always apportioned between burner 1 and mixing device 6 in the ratio of one to two, respectively.

In order that the rate of flow of so-apportioned hydrogen sulphide and air into the process-apparatus will not only be that required for a given through-put, but can be employed to compensate also for fluctuations in system-pressures to maintain them at a chosen level, their rate of flow is in the present embodiment of the invention made responsive to fluctuations of pressure at a preferred point of the apparatus-system; in the accompanying drawing this point is mixing device 6. By means of line 44 that interconnects the latter with the one side of diaphragms of pressure-differential flow-regulating valves controlling the flows of hydrogen sulphide and air into and from their respective pressure-storage tanks 40, 49, system-pressures are kept at a constant level despite possible tendency of fluctuations therein to develop. For example, let it be assumed that the apparatus-system is operating satisfactorily at a predetermined pressure in mixing device 6. This pressure is transmitted through line 44 to one side of the diaphragms controlling the settings of the openings in flow-regulating valves 42, 54, and consequently respectively determines the rate at which hydrogen sulphide is delivered from line 38 by compressor 39 and line 41 into pressure-storage tank 40, and determines also the apportioned rate at which the same is flowed from said tank into mixing device 6 and inspirator 57 respectively through lines 15, and through lines 55a, 56. Simultaneously, this same pressure in line 44 exerts a force on the diaphragm that controls the setting of valve 53 which in turn determines the rate at which combustion-air is flowed from pressure-tank 49 into line 50 and inspirator 57 where it is admixed by inspiration with hydrogen sulphide delivered also by the system-controlled setting of valve 54. In turn, the pressure of air in its line 50 is transmitted through line 51 to one side of a diaphragm that controls the opening of that valve 47 which determines the amount of air drawn from the atmosphere through line 48 to its storage-tank 49. As long as the settings of the said pressure-differential flow-regulating valves 42, 54, 53, 47 remain such that the apportioned hydrogen sulphide and the required air are delivered to the conversion apparatus at a rate which maintains constant the said predetermined pressure in mixing device 6 and consequently also in line 44, all other things being equal, existing pressure conditions throughout the whole apparatus will remain constant. However, if for any reason there occurs a reduction in the static pressure in said mixing device 6, this reduced pressure is immediately transmitted to the diaphragms of valves 42, 54, and 53, by line 44 and thereby alters the existing differential of pressure between their opposite sides to increase the valve openings and allow that increase of hydrogen sulphide to be delivered to its storage tank 40 by compressor 39 which will satisfy its greater rate of flow therefrom that is occasioned by the simultaneous increase in the opening of valve 54 controlling the delivery of hydrogen sulphide to inspirator 57; and the same impulse in line 44 simultaneously allows more combustion-air to pass from its tank 49 into said inspirator through line 50 from valve 53; the resultant increase of pressure in line 50 increases in turn the pressure in line 51 which carries the impulse to that side of the diaphragm of valve 47 which causes its further opening, thereby allowing air-compressor 46 to deliver the increased requirement of air to its storage tank 49. As will be noted, the pressure-sensitive diaphragm of hydrogen sulphide valve 42 is actuated by the differential pressure between mixing device 6 and the static pressure of tank 40 operating through lines 44, 43, respectively, whereas the diaphragm of air-valve 47 is actuated by the differential of pressures in air-tank 49 and line 50 operating through lines 52, 51, respectively. All these simultaneously produced openings of the stated valves, by their increasing the rates of flow of hydrogen sulphide and air into the process-system, tend to restore the predetermined operating pressures therein; obviously, an increase of pressure in mixing device 6 similarly operates to decrease the existing openings in the gas-flow regulating system and to decrease the delivery of reactants thereto.

The following specific example is illustrative of the results obtainable by operation of the present invention.

A gaseous mixture, such for example as is effluent to the actifier of a hot-actification process for removal of hydrogen sulphide from a fuel gas and comprising about 60 per cent hydrogen sulphide, about 35 per cent carbon dioxide with the remainder made up of hydrocarbons, was flowed to a system, as above-described, for converting its hydrogen sulphide content to elemental sulphur. Of three parts by volume of said gaseous mixture (measured at 60° F. and 30 inches mercury) flowing to the system, one part was admixed with air, both being under pressure, and the admixture was thereafter burned in a tunnel-type surface-combustion burner, while two parts were reserved for later admixing with the products of said combustion. The volume ratio (measured at 60° F. and 30 inches mercury) of said gaseous mixture to air was one part to about 4.8 parts respectively, said volume of air being sufficient for complete combustion of all constituents of said gaseous mixture. The products of said combustion were indirectly cooled to about 320° C. and thereafter admixed with the other two parts of said hydrogen-sulphide-containing gas. The resulting admixture, having a temperature of about 250° C. was passed into contact with a bauxite catalyst, and the gases and vapors issuing therefrom at about 500° C. were immediately shock chilled by a water spray to convert sulphur vapors to liquid sulphur. At this point, the liquid sulphur had a temperature of about 125° C., the pressure being about 19 pounds per square inch gauge. The recovery of liquid sulphur effected by means of this novel process of controlled shock chilling of vapors after catalytic reaction in the vapor phase averaged 77 per cent of the total available in the reactants. The remaining uncombined hydrogen sulphide and sulphur dioxide were then brought into countercurrent contact in a suitable tower, with cold water entering the same. Analysis of outlet gases from said tower, to determine the uncombined hydrogen sulphide present therein, indicated that at least about 96 per cent of the hydrogen sulphide entering the sulphur recovery system had been converted to elemental sulphur in the combination of reaction stages.

Obviously, the advantages of the present improvement for obtaining high yields of elemental sulphur from hydrogen sulphide by one passage through a process-system can be realized also in those instances where hydrogen sulphide and sulphur dioxide are separately available as such, or as constituents of admixtures, and heat for the efficient vapor-phase reaction can be obtained by preheating said gases in any known fashion.

The hereinabove-described means for controllably regulating the air required and for substantially completely burning hydrogen sulphide to produce sulphur dioxide, can be so regulated as to furnish any necessary additional air and to effect a concomitant combustion along with the hydrogen sulphide of any other combustible gases, for example, hydrocarbons that may be present in a gaseous mixture containing hydrogen sulphide and derived from fuel gases.

The invention as hereinabove set forth is embodied in particular form and manner but may be variously embodied within the scope of the claims hereinafter made.

I claim:
1. An improved process for converting hydrogen sulphide and sulphur dioxide in gaseous admixture into elemental sulphur, said process comprising the steps of: reacting said components of the gaseous admixture with each other, in a reaction zone therefor and in the absence of liquid water, to produce elemental sulphur at a temperature sufficiently high to retain so-produced sulphur in its vapor phase; cooling products of said reaction by direct contact with liquid water having a temperature at least above the melting point of the so-produced sulphur and thereby condensing the latter to its liquid phase; and, thereafter, treating gases that are residual to said cooling step by direct contact with water at a temperature lower than said cooling step.

2. An improved process for converting hydrogen sulphide and sulphur dioxide in gaseous admixture into elemental sulphur, said process comprising the steps of: reacting said components of the gaseous admixture with each other, in a reaction zone therefor and in the absence of liquid water, to produce elemental sulphur at a temperature sufficiently high to retain so-produced sulphur in its vapor phase; cooling products of said reaction by direct contact with a cooling liquid having a temperature at least above the melting point of the so-produced sulphur and thereby condensing the latter to its liquid phase; and, thereafter, treating gases that are residual to said cooling step by direct contact with water at a temperature lower than said cooling step.

3. An improved process for converting hydrogen sulphide and sulphur dioxide in gaseous admixture into elemental sulphur, said process comprising the steps of: reacting said components of the gaseous admixture with each other, in a reaction zone therefor and in the absence of liquid water but in the presence of a solid catalyst, to produce elemental sulphur at a temperature sufficiently high to retain so-produced sulphur in its vapor phase; cooling products of said reaction by direct contact with liquid water having a temperature at least above the melting point of the so-produced sulphur and thereby condensing the latter to its liquid phase; and, thereafter, treating gases that are residual to said cooling step by direct contact with water at a temperature lower than said cooling step.

4. An improved process for converting hydrogen sulphide and sulphur dioxide in gaseous admixture into elemental sulphur, said process comprising the steps of: reacting said components of the gaseous admixture with each other, in a reaction zone therefor and in the absence of liquid water but in the presence of a solid catalyst, to produce elemental sulphur at a temperature sufficiently high to retain so-produced sulphur in its vapor phase; cooling products of said reaction by direct contact with liquid water having a temperature at least above the melting point of the so-produced sulphur and thereby condensing the latter to its liquid phase; and, thereafter, treating gases that are residual to said cooling step by direct contact with water at a temperature lower than said cooling step; the said steps being all carried out at above atmospheric pressure.

5. An improved process for converting hydrogen sulphide or gases containing the same into elemental sulphur, said process comprising: reacting the combustion products of an admixture comprising air and a hydrogen-sulphide-containing gas, with appropriate further quantities of said hydrogen-sulphide-containing gas, in the absence of liquid water but in the presence of a solid catalyst, to produce elemental sulphur at a temperature sufficiently high to retain so-produced sulphur in its vapor phase; cooling products of said reaction by direct contact with liquid water having a temperature at least above the melting point of the so-produced sulphur and thereby condensing the latter to its liquid phase; and, thereafter, treating gases that are residual to said cooling step by direct contact with water at a temperature lower than said cooling step.

6. An improved process for producing elemental sulphur from hydrogen sulphide or gases containing the same, said process comprising: in appropriate combustion means, burning an admixture of air and a hydrogen-sulphide-containing gas and thereby converting said hydrogen sulphide to sulphur dioxide; admixing sulphur dioxide containing products of combustion with further and appropriate quantities of said hydrogen-sulphide-containing gas; reacting said components of the gaseous admixture with each other, in a reaction zone therefor and in the absence of liquid water but in the presence of a solid catalyst, to produce element sulphur at a temperature sufficiently high to retain so-produced sulphur in its vapor phase; cooling products of said reaction by direct contact with liquid water having a temperature at least above the melting point of the so-produced sulphur and thereby condensing the latter to its liquid phase; and, thereafter, treating gases that are residual to said cooling step by direct contact with water at a temperature lower than said cooling step; the said steps being all carried out at above atmospheric pressure.

7. An improved process for converting hydrogen sulphide and sulphur dioxide in gaseous admixture into elemental sulphur, said process comprising the steps of: reacting said components of the gaseous admixture with each other, in a reaction zone therefor and in the absence of liquid water, to produce elemental sulphur at a temperature sufficiently high to retain so-produced sulphur in its vapor phase; cooling products of said reaction by direct contact with liquid water having a temperature at least above the melting point of the so-produced sulphur and thereby condensing the latter to its liquid phase; providing a layer of said cooling water, sealing condensed sulphur therebelow and thereby permitting residual hydrogen sulphide and sulphur dioxide further to react in the presence of liquid water, yet in the vapor phase; and, thereafter, treating gases that are residual to said cooling step by direct contact with water at a temperature lower than said cooling step.

8. An improved process for converting hydrogen sulphide and sulphur dioxide in gaseous admixture into elemental sulphur, said process comprising the steps of: reacting said components of the gaseous admixture with each other, in a reaction zone therefor and in the absence of liquid water but in the presence of a solid catalyst, to produce elemental sulphur at a temperature sufficiently high to retain so-produced sulphur in its vapor phase; cooling products of said reaction by direct contact with liquid water having a temperature at least above the melting point of the so-produced sulphur and thereby condensing the latter to its liquid phase; providing a layer of said liquid cooling water and employing gravity means to seal produced sulphur therebelow, where said sulphur can no longer upset the reaction equilibrium of its production; and, thereafter, treating gases that are residual to said cooling step by direct contact with water at decreasing temperatures.

9. An improved process for converting hydrogen sulphide and sulphur dioxide in gaseous admixture into elemental sulphur, said process comprising the steps of: reacting said components of the gaseous admixture with each other, in a reaction zone therefor and in the absence of liquid water but in the presence of a solid catalyst, to produce elemental sulphur at a temperature sufficiently high to retain so-produced sulphur in its vapor phase; cooling products of said reaction by direct contact with liquid water having a temperature at least above the melting point of the so-produced sulphur and thereby condensing the latter to its liquid phase; in a vapor-phase reaction zone and in the presence of liquid water as a catalyst, further reacting with each other said components of the gaseous admixture that are residual to said reaction in the first step, to produce further quantities of elemental sulphur; and treating gases that are residual to said second vapor-phase reaction by direct contact with water at decreasing temperatures; the said steps being all carried out at above atmospheric pressure.

10. An improved process for converting hydrogen sulphide and sulphur dioxide in gaseous admixture into elemental sulphur, said process comprising the steps of: reacting said components of the gaseous admixture with each other, in a reaction zone therefor and in the absence of liquid water, to produce elemental sulphur at a temperature sufficiently high to retain so-produced sulphur in its vapor phase; cooling products of said reaction by direct contact with liquid water having a temperature at least above the melting point of the so-produced sulphur and thereby condensing the latter to its liquid phase; and treating gases that are residual to said cooling step by direct contact with water, first with water having a temperature at least above the melting point of condensed sulphur, thereafter with colder water.

11. An improved process for producing elemental sulphur from hydrogen sulphide or gases containing the same, said process comprising: in appropriate combustion means, burning an admixture of air and a hydrogen-sulphide-containing gas and thereby converting said hydrogen sulphide to sulphur dioxide; admixing sulphur dioxide containing products of combustion with further and appropriate quantities of said hydrogen-sulphide-containing gas; reacting said components of the gaseous admixture with each other, in a reaction zone therefor and in the absence of liquid water but in the presence of a solid catalyst, to produce elemental sulphur at a temperature sufficiently high to retain so-produced sulphur in its vapor phase; cooling products of said reaction by direct contact with liquid water having a temperature at least above the melting point of the so-produced sulphur and thereby condensing the latter to its liquid phase; in a vapor-phase reaction zone and in the presence of liquid water as catalyst, further reacting with each other said components of the gaseous admixture that are residual to said reaction in the above third process step, to produce further quantities of elemental sulphur; providing a layer of said liquid cooling water and employing gravity means to seal produced sulphur therebelow, where said sulphur can no longer upset the reaction equilibrium of its production; and treating gases that are residual to said second vapor-phase reaction by direct contact with water, first with water having a temperature at least above the melting point of condensed sulphur, thereafter with colder water; the said steps being all carried out at above atmospheric pressure.

12. An improved process for recovering elemental sulphur from a mixture containing the same in vaporous form, said process comprising, in a cooling step, cooling said mixture by direct contact with a cooling agent immiscible with and of a specific gravity lower than the sulphur, at a temperature above the melting point of sulphur while under conditions of pressure within the cooling step at which the liquid cooling agent which absorbs the heat of condensation of the sulphur in the mixture, as well as the elemental sulphur that is precipitated thereby, remains entirely in liquid form in said cooling step during absorption of heat of condensation of sulphur in cooling of the mixture therein, and while thereafter in contact with the sulphur, and thereafter separating said cooling agent from thereby condensed sulphur as an overlying layer of cooling agent while they are both still in liquid form.

13. An improved process for recovering elemental sulphur from a mixture containing the same in vaporous form, said process comprising, in a cooling step, cooling said mixture by direct contact with water at a temperature above the melting point of sulphur while under conditions of pressure within the cooling step effective for maintaining the cooling water which absorbs the heat of condensation of the sulphur in the mixture, as well as the elemental sulphur that is precipitated thereby, entirely in liquid form in said cooling step during absorption of heat of condensation of sulphur in cooling of the mixture therein, and while thereafter in contact with the sulphur which readily separates as an underlying layer, and thereafter separating said cooling water from so-formed liquid sulphur while they are both still in liquid form.

WILLIAM O. KEELING.